Aug. 17, 1971    A ROUGEUX    3,600,150
APPARATUS FOR TEMPERING AND BENDING GLASS SHEETS
Filed July 10, 1968    3 Sheets-Sheet 2
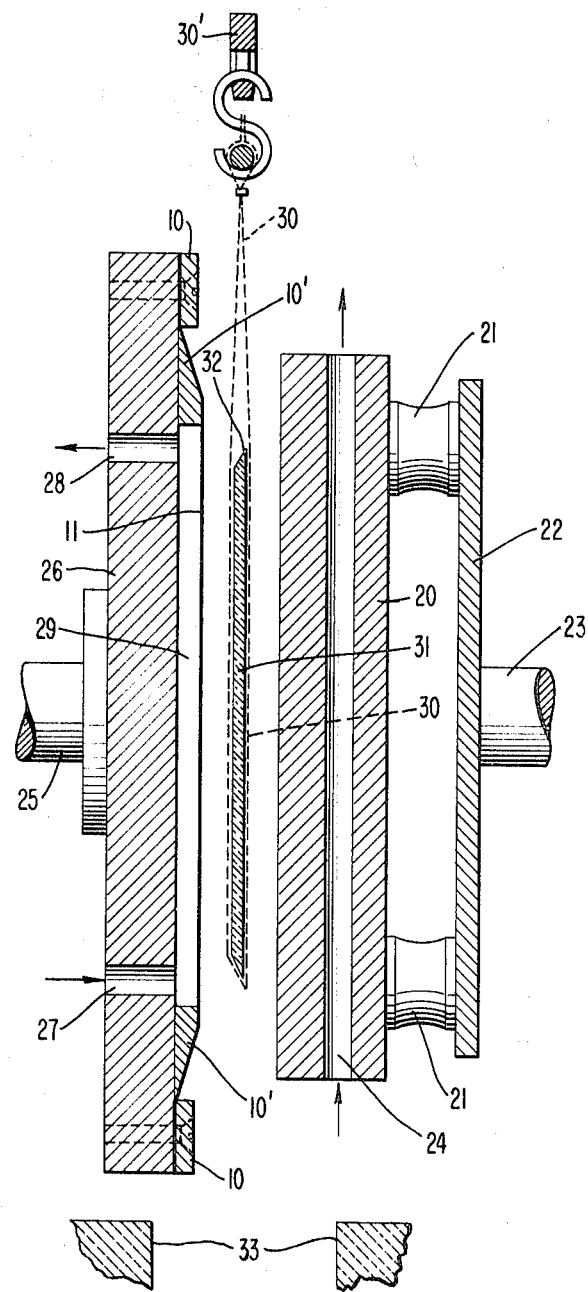
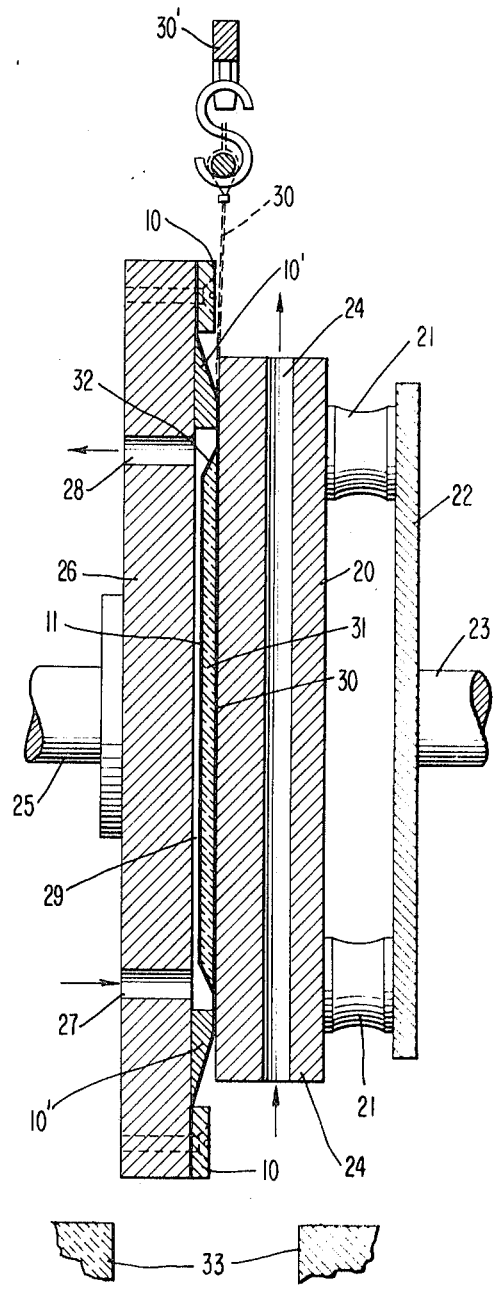
INVENTOR.
ANDRE ROUGEUX
BY
Bauer and Seymour
ATTORNEYS INVENTOR.
ANDRE ROUGEUX
BY
Bauer and Seymour
ATTORNEYS

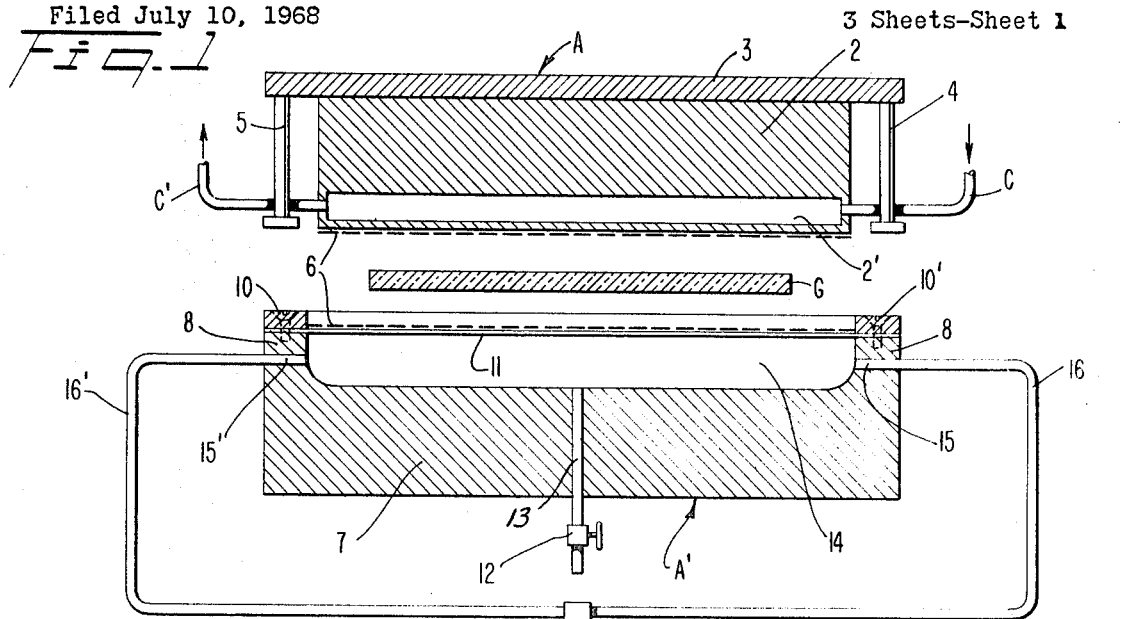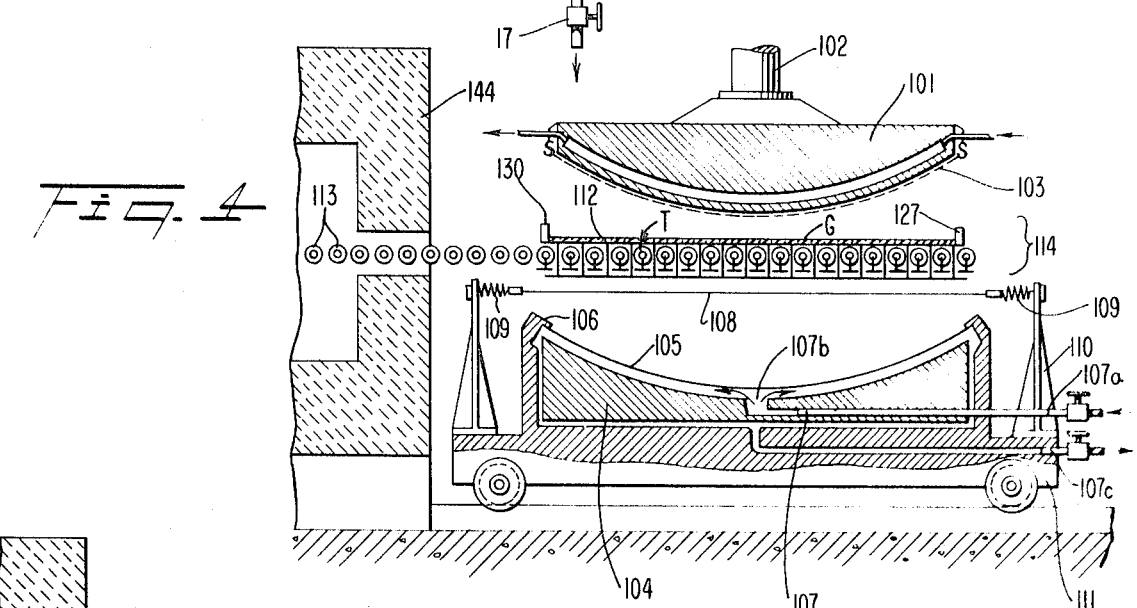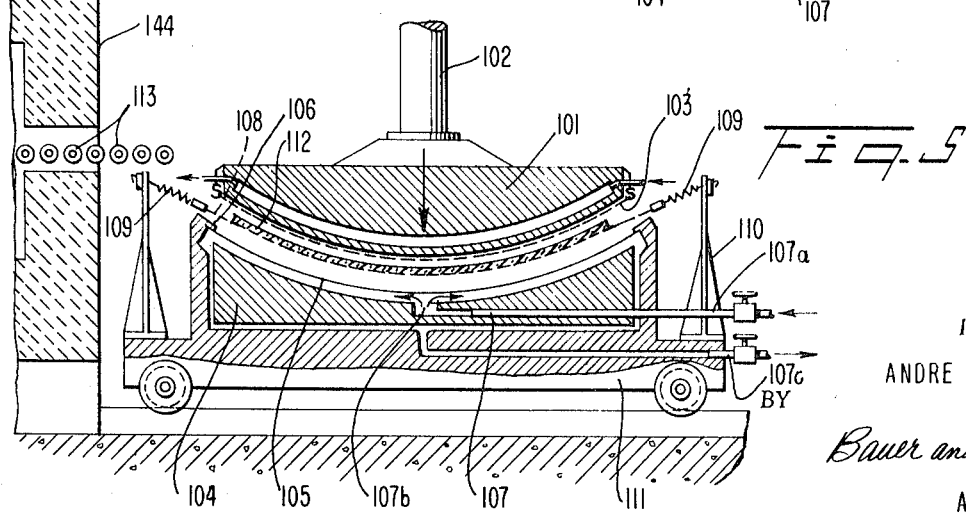

United States Patent Office 3,600,150
Patented Aug. 17, 1971

3,600,150
APPARATUS FOR TEMPERING AND BENDING GLASS SHEETS
André Rougeux, Colombes, France, assignor to Compagnie de Saint-Gobain, Neuilly-sur-Seine, France
Filed July 10, 1968, Ser. No. 743,696
Claims priority, application France, July 13, 1967, 114,203; May 10, 1968, 151,472
Int. Cl. C03b 23/02, 27/00
U.S. Cl. 65—268
11 Claims

ABSTRACT OF THE DISCLOSURE

Apparatus for bending and tempering glass sheets by contact with two refrigerated forms, one of which is rigid and the other of which is flexible. The flexible form comprises a flexible fabric membrane which is sealed to a fixed rim to form an enclosed pressure chamber. Conduits circulate a cooling fluid which contacts the faces of both forms and which applies pressure to the membrane. A sling of flexible refractory fibers supports the glass sheets between the forms when the forms are disposed in a vertical plane. When the forms are disposed in a horizontal plane, a flexible fabric hammock supports the glass between them. A split carriage having two sections moves the glass sheet and lays it upon the hammock by separation of the two sections.

---

This invention relates to the handling and working of hot glass sheet at temperatures on the order of those employed for tempering, bending, and deformation. The handling is devised to protect the sheet at all stages and to lend efficiency to the working. The working may be purely thermal, purely mechanical, or both, and it may involve other operations. The process is adapted to use with any thermoplastic sheet whether organic or inorganic, but it is of special value in the tempering and bending of glass sheet and will be described in its relation to that subject.

It is an object of the present invention to temper and to bend glass sheet, either operation alone or both at once. Another object is to present novel apparatus of superior performance for such operations. It is known to press malleable glass sheet against a rigid form by a flexible member; it is another object to apply fluid pressure of uniform intensity throughout the area of the flexible member engaged in the pressing operation. Other objects are to apply the invention to plastic sheeting of other types, such as to thermoplastic sheets of polymeric organic material such as polyvinyl chloride. Other objects are to heat and handle the sheet before, during, and after pressing, constituting a new industrial operation, and to do it quickly. Another object is to protect the faces of the glass as it undergoes the various steps of the process, particularly during pressing. Another object is to temper bevelled glass sheet and the like and to reinforce it during tempering.

The objects are accomplished, generally speaking, by a process wherein hot sheet at bending or tempering temperature is pressed against a rigid form by fluid pressure, and in which the glass is protected against marring by the form, by novel means. In the invention the glass sheet is brought to about its softening range by heating, and is promptly placed between the jaws of a mold, of which one jaw is rigid and the other flexible but under fluid pressure, between which it is chilled or shaped and chilled. The jaws of the mold are heat exchangers which rapidly draw heat out of the sheet, the rate of cooling being the swifter as the degree of temper is to be the higher. The invention also includes novel apparatus for handling the hot sheet for vertical or for horizontal treatment.

It is known that glass sheet may be tempered by pressing it, after preliminary heating to the vicinity of its softening point, between two heat conducting plates which are cooled interiorly by a refrigerant such as a flow of water. To prevent direct contact between the plates and the glass surface, it is customary to interpose a thin layer of insulating material, for example a fabric of glass. According to the present invention one of the two cold forms constituting the jaws of the pressing apparatus is rigid and the other one is flexible and under fluid pressure. In effect that jaw is composed of a pressure chamber, the glass-contacting face of which is composed of a flexible membrane substantially impermeable to the fluid used, which covers a pressure chamber supplied with a circulating system which maintains a selected pressure, temperature, and rate of flow. As apparatus for controlling temperature, pressure, and flow rate are known, they will not be described. Because of the flexibility of the pressure membrane, it conforms itself closely to the shape of the sheet of glass regardless of irregularities of shape and surface and applies pressure to all parts so that the entire area of the glass sheet is applied to the rigid form with complete uniformity. The viscosity of the preheated sheet will have some bearing on the speed of the process but the use of the membrane under pressure provides that the entire area of the sheet receives the same cooling treatment. As the flow of fluid into the chambers behind the pressure faces of the jaws can be regulated at will, the regular removal of heat and the highest quality of product is assured whether the process involves tempering, bending, or both. Of course, the pressure employed behind the membrane must be less than the breaking strength of the apparatus but sufficient to shape the glass against the rigid form. As a pressure on the order of 100 g./cm.$^2$ suffices, it is easy to find a membrane which is impermeable and mechanically capable of resisting such pressures at the temperatures of use, for example 200° C. The thermal conductivity of the membrane ought to be of the same order as that of the rigid form so as to produce a symmetrical cooling of the two faces of the glass sheet. Such a membrane may be composed of a fabric of glass fibers which have been cleaned, deoiled, and degreased, and of which both faces have been uniformly impregnated with silicone then pressed to produce homogeneity and uniform thickness. The silicone seals the pores in the glass fabric and imparts elasticity to it. Impregnation of one face of the glass fabric is sufficient for many uses but in that case it is preferable to have the impregnated side out of contact with the glass. In many instances it is desirable to remove heat at an equal rate from both sides of the sheet, and this can be influenced by choosing the cover for the rigid jaw with some attention to its thermal conductivity, for instance by making it thicker or thinner, or of a material more or less conductive to heat.

The process and apparatus has a particular application in the bending and tempering of bevelled glass and other forms of flat glass in which thickness is not uniform. According to one form of the invention applicable to the tempering of sheets of bevelled glass, and particularly to sheets of small dimensions, it is advantageous both during tempering, bending, and during operations which precede and follow them, to support the glass sheet in a sack or fold of fabric made of refractory fibers. The sack can be used to transport the glass in vertical alignment from a furnace to vertical pressing jaws. When glass sheet is to be both bent and tempered it is advantageous to arrange the pressing jaws horizontally with the flexible, fluid-pressed membrane disposed beneath a hammock of glass-fiber fabric which is supported elastically between the pressing jaws, both the lower jaw and the hammock being carried on a truck. At the beginning of the operation the truck is brought beneath the rigid pressing jaw, and means are provided to bring the glass sheet from the preheating furnace between the jaws and deposit it on the hammock. As uniformity of product is desirable, the apparatus for handling the sheet is provided with means for orienting it so that all of a series of sheets will be uniformly placed between the jaws. In the preferred form of the invention this handling means involves two half tables which are movable perpendicularly to the direction of motion of the glass sheet; each half table involving on one hand a series of idler rollers, the axes of which are perpendicular to the direction of motion of the sheet, and on the other hand a vertically movable plate equipped with idler wheels of which the axes of rotation are perpendicular to those of the idler rollers. The sheet of glass issuing at softening temperature from a furnace is supported first by the idler rollers then raised by the idler wheels of the movable plate. Having been oriented in the meantime by appropriate means, the hot sheet is dropped onto the hammock by pulling the half tables out from under it. The half tables include means for guiding and centering the glass sheet laterally and longitudinally.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a vertical, sectional view, diagrammatic in nature illustrating a simple form of apparatus for tempering glass sheet in a horizontal position;

FIGS. 2 and 3 are vertical sections through an apparatus for tempering a bevelled sheet and supporting it while it is being tempered. FIG. 2 shows the apparatus with jaws apart and FIG. 3 with jaws pressed upon the sheet of glass during tempering;

FIGS. 4 and 5 are vertical, sectional views through a novel apparatus for simultaneously bending and tempering glass, FIG. 4 showing the jaws and handling mechanism in preliminary position and FIG. 5 showing the pressing operation;

Figure 6:
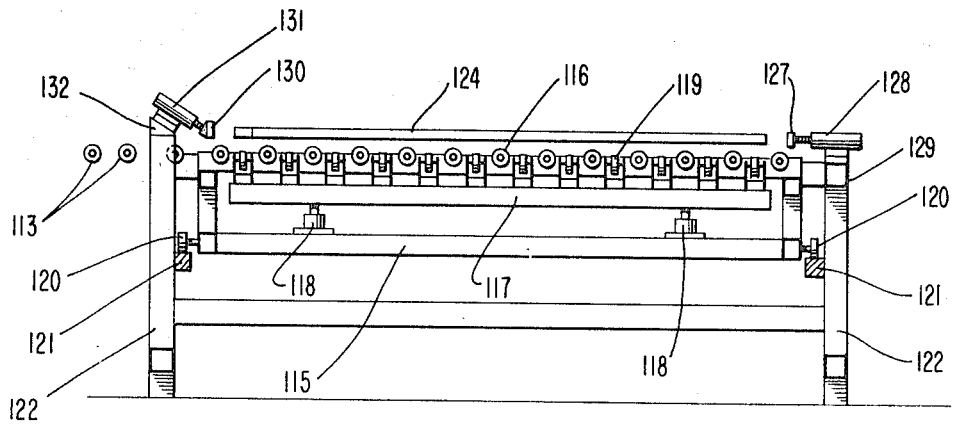
FIG. 6 is a diagrammatic elevation of the sheet handling apparatus employed in FIG. 4, viewed from the right hand end of FIG. 7.
Figure 7:
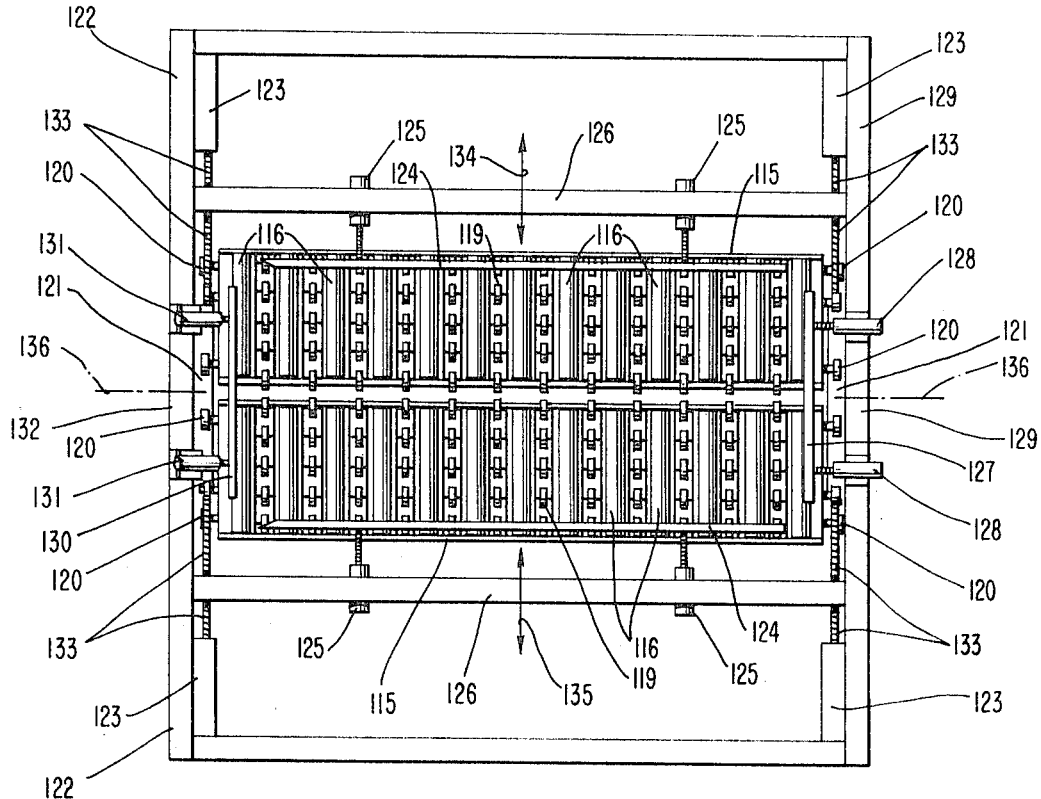
FIG. 7 is a plan view of the apparatus of FIG. 6 rotated 90° counterclockwise.

FIG. 1 is a diagrammatic view of a simple form of apparatus for carrying out the invention. A, A' are the movable jaws of a tempering machine. G is a plate of hot glass at its softening point which is between the jaws for tempering. The upper jaw 2 is a metallic block which has a chamber 2' adjacent its operating face. The chamber is supplied with cooling fluid by conduits C, C'. Legs 4, 5 are provided with longitudinally adjustable feet which provide for the correct spacing of the face of the block from the face of the opposing block by engaging the projecting portions 10, 10' thereof. The face of block A is covered by a smooth fabric 6, for instance of woven silica glass. The block A' is provided with a body portion 7 which has a raised rim 8 forming a hollow portion 14 across the top of which an impermeable, flexible membrane 11 is clamped by the rings 10, 10'. A valve 12 and conduit 13 deliver a fluid under pressure, for instance air, to the chamber 14 from which it escapes by ports 15, 15' and pipes 16, 16' to valve 17. By adjusting the valves 12 and 17 the pressure in chamber 14 and the rate of flow of the cooling medium can be controlled. The fluid medium which supplies the fluid pressure may be either gaseous or liquid. If water is used it may be at the temperature of the plant supply or it may pass first to a refrigerator.

When the sheet G is to be tempered it is heated, introduced between the jaws A, A' and the jaws are brought together upon it.

In FIGS. 2 and 3 the rigid jaw 20 is supported vertically by studs 21 from plate 22 which is mounted on piston 23. The cooling medium flows through chamber 24, back of the working face of the block. The opposite jaw has a piston 25 which supports a jaw element 26 through which holes 27, 28 are bored to deliver cooling fluid to a chamber 29 formed between a membrane 11 and the face of the jaw element 26. The membrane is fastened at its rim beneath ring 10 and passes over a ring 10' to establish the chamber 29, into which fluid under pressure is admitted for purposes of cooling. The sheet of glass 31 has bevelled edges 32; it is supported in a sling 30 composed of a folded fabric sheet of material such as glass fibers. The sheet is supported by a hoist 30'.

In the operation of this form of the invention the pistons 23, 25 will be retracted to separate the jaws, the cold sheet 31 will be lowered into a pit furnace 33, raised to softening temperature, lifted rapidly between the jaws and clamped as shown in FIG. 3 with the beveled edges of the sheet facing the membrane. It will be observed that all parts of the sheet including the bevelled edges are subjected to equal pressure, and equal support and protection during the operation. This apparatus and process is highly effective in reducing the percentage of breakage, which is especially valuable in tempering sheets having differences in thickness.

In a particular example directed to the operations of the type of FIGS. 1, 2, and 3, a sheet of ordinary window glass having a thickness of 5–6 mm. was tempered between a rigid jaw covered with a protective fabric. The membrane forming the working face of the flexible jaw was a fabric of glass fibers having a thickness of 0.16 mm. The glass had been deoiled and degreased and impregnated on each face with a silicone called Silastene 632. After impregnation it was pressed to a final thickness between 0.3 and 0.4 mm. Each jaw was protected with a glass fabric which had also been thoroughly cleaned and which was 0.16 mm. thick. As this proved to give unbalanced heat transfer, another fabric of 0.09 mm. thickness was placed over the face of the rigid jaw, thus providing substantially uniform heat transfer. The membrane lasted to temper 2,500 sheets of glass before replacement. The glass sheets from this operation had a fragmentation of 165 to 230 pieces per 5 cm.$^2$ of area. The heat conduction of the apparatus increased slightly during this operation but had no effect on the planimetry of the glass sheets which were produced.

When the invention was applied to the production of bevelled glass sheets of equal temper, the results were equally good.

Apparatus of this sort is useful not only for the tempering of flat glass of plane surfaces but for tempering of flat glass of curved surfaces. In the latter case the rigid jaw will be provided with the desired curvature and the flexible membrane will be applied to a complementary jaw of which the face has a curvature corresponding to that of the rigid form. In some cases it will not be necessary to shape the face of the second jaw because the flexible membrane will serve to bend the glass over the curved face of the first jaw. For example, in FIG. 1 the jaw 2 could be provided with moderate curvature which could be accommodated by the flexible membrane 11 before any portion of the membrane engaged the bottom of the chamber 14.

In the apparatus of FIGS. 4 and 5 a furnace 144 heats the glass horizontally, the sheet 112 being transported on rollers 113 out of the furnace and onto a split table T of particular construction. The upper form 101 is rigid and is carried on a piston 102. Its working face is covered by a protective fabric 103 which is under spring tension. The jaw 101 is provided with an interior chamber through which fluid passes.

The lower jaw 104 is mounted on a truck 111 which can be moved into and withdrawn from working position by means not shown. Standards 110 mounted on the ends of the truck support springs 109 which in turn support flexible hammock 108 above the lower form. The lower form has a concave face which conforms to the convex face of the upper and which consists of a flexible fabric 105 of the type hereinabove described. Beneath the fabric is a space filled with fluid under pressure supplied by a pipeline 107a and relieved by pipeline 107c. Flexible hoses controlled by valves control the flow of cooling fluid and permit the movement of the carriage.

In the operation of FIGS. 4 and 5, the hot sheet of glass G is centered beneath the rigid form 101, is dropped upon the hammock 108 by the split table T, which moves out of the way, the piston 102 descends, the glass is bent between the hammock and the working face of the rigid form (FIG. 5), and pressed against the cold surface of membrane 105. In this operation bending and tempering proceed simultaneously as the operation is quite rapid. Bending may be advanced or even completed against the hammock but in many cases the completion awaits contact with the fabric 105. The transfer apparatus 114 is constituted by two half tables 115 each of which has a series of parallel idler rollers 116 and a vertically movable frame 117, controlled by screws 118, equipped with idler wheels 19 of which the axes of rotation are perpendicular to those of idler rollers 116. Four wheels 120 rest on rails 121 of a fixed frame 122, permitting each of the half tables 115 to be displaced perpendicularly to the axis 136 of the furnace under the command of screws 133 operated from rotatable nuts inside elements 123. Such construction is known and needs no detailed description. The screws 133 are controlled so that the half tables 115 move symmetrically with respect to the axis of the furnace as indicated by the arrows 134, 135 of FIG. 6.

Two guides 124 of which the flanks are parallel to the axis of the furnace are controlled by screws 125 fixed on stringers 126 attached to the fixed frame 122. The guides 124 center the glass sheet laterally, and a downstream abutment 127 is controlled by screws 128 fixed on crosspiece 129 of the frame 122. An upstream abutment 130 is elevated to permit the passage of the sheet from the furnace and is controlled by screws 131 fixed on the crosspiece 132. The abutments 128 and 130 center the glass sheet longitudinally, the ends of which are perpendicular to the axis of the furnace.

The operation of transfer and centering of the glass sheet is as follows:

Before the sheet issues from the furnace, the two half tables are put together. The upper generatrices of the rollers 116 are in the same plane as that of idler rollers 113 which support the glass in the furnace. The idler wheels 119 are located a few millimeters below the level of rollers 116. The abutments 130, 127 and the lateral guides 124 are retracted. The upper frame 101 is withdrawn. At the beginning of the cycle the glass sheet, having been brought to softening temperature in the furnace, issues at high speed and is received by the idlers 116 on which it is braked. At the end of its slowdown it is stopped against the downstream abutment which is connected to a switch which controls the operation of the upstream abutment 130 by energizing the screws 131. Such controls are known and need no particular description. The downstream abutment is moved by screws 128 at the same time and the two abutments thus center the glass sheet longitudinally. The mobile frame 117 is raised by screws 118. The sheet of glass 112 is engaged by the idler wheels 119 which have been lifted to a few millimeters above the tops of the idler rollers 116. The lateral guides 124 are advanced by screws 125 which center the sheet G laterally. The two half tables 115 are pulled out from under the sheet G which falls onto the hammock 108 which, bending under the weight of the glass and yielding as permitted by springs 109, imparts an original shape approaching that of the upper form before the form has acted. The two half tables move out of the way of the upper form which presses downward, engages the glass, and, as permitted by the springs, presses the glass and the hammock against the lower form, that is to say the cold membrane 105. After adequate cooling the rigid form is raised, and truck 111 is released to permit the removal of the sheet of glass. This is usually accomplished by moving the truck away from its working position, removing the glass and moving the truck back to operating position again, all of which is accomplished while the half tables are being returned to supporting position.

In the particular apparatus described hereinabove, the rigid form is made of graphite and is covered with a tissue of glass fabric 0.16 mm. thick. The dimensions of the sheet of glass treated in a particular operation were 1200 x 460 x 5 mm. The hammock was a tissue of glass fabric having a thickness of 0.09 mm. The tension exercised by the springs 109 was 10 kg. The membrane constituting the flexible form was a tissue of cleansed glass coated on each face with a silicone resin which made the membrane impermeable and gave it a certain amount of elasticity. The sheets of bent and tempered glass, when tested, had a play of a few tenths of a millimeter in its circumference and the fragmentation upon breaking was 200 pieces per 25 cm.$^2$.

Many modifications can be made in the apparatus without departing from the scope of the invention. For instance, the flexible membrane can be composed of metallic fabric of fine mesh such as bronze or stainless steel, suitably resinified to prevent the escape of the fluid. The pressure back of the membrane may be sufficient to perform the entire bending operation or it can be reduced to the point where it performs little function other than cooling the glass. The tension applied to the hammock can be varied to complete the bending before the flexible form is engaged, to partially complete the bending, or to leave the bending to the flexible form. The elastomer of silicone or tetrafluoroethylene, or the like, may be made a better conductor of heat by incorporating fillers such as acetylene black. There are a number of resins which will stand temperatures of 200°–250° C. without disintegration and they are generally useful although the silicones and tetrafluoroethylene are preferred. Fine metallic particles inert to glass can be incorporated in the resinous component of the flexible membrane to increase its heat conductivity.

As many apparently widely different embodiments of the present invention may be made without departing from the spirit and scope thereof, it is to be understood that the invention is not limited to the specific embodiments.

What is claimed is:

1. Apparatus for the thermal treatment of thermoplastic sheets which comprises opposed pressing means, one of which is rigid and the other of which is flexible, and which are arranged to engage the opposite sides of the thermoplastic sheet, said flexible pressing means comprising a flexible fabric sheet of heat-resistant fibers, which is impregnated with a flexible heat-resistant obturator selected from the group consisting of silicone elastomers and fluoroethylene polymers, said flexible fabric sheet being sealed to and secured to a fixed rim to form an enclosed pressure chamber, means to introduce pressure fluid to said pressure chamber, so as to apply fluid pressure to said flexible fabric sheet, means to move a heated thermoplastic sheet between said opposed pressing means, and means to move the opposed pressing means into contact with the heated thermoplastic sheet to cool the sheet, said opposed pressing means being arranged with their pressing surfaces in a vertical plane, and said means to move the heated sheet comprising a flexible sling means to suspend the thermoplastic sheet between the vertical faces.

2. An apparatus for bending and cooling thermoplastic sheets comprising opposed flexible and rigid bending forms, arranged with their contacting faces in a horizontal plane, means to relatively move the bending forms in a vertical plane to press upon a sheet of thermoplastic material, said flexible form comprising a flexible fabric sheet which is heat-resistant and fluid impermeable, in which the sheet is sealed to a rim to form a pressure chamber, means to apply pressure to the chamber to apply uniform pressure to the area of the flexible fabric, means to cool both bending surfaces by circulating a cooling medium, a flexible fabric hammock arranged to support a sheet of thermoplastic material between the bending forms, and means to move the heated thermoplastic sheet between the bending form and to lay it upon the hammock, said means comprising a split carriage having two sections, means to move the hot sheet onto the carriage, and means to separate the two sections to drop the sheet onto the hammock.

3. A bending and tempering apparatus comprising opposed flexible and rigid bending forms and means to press said forms upon a sheet of thermoplastic material, the flexible bending means comprising a flexible, fluid impermeable membrane covering and sealing the open face of a closed chamber, fluid pressure means for supplying pressure fluid to said chamber to press upon the flexible pressing form, and means to cool both the rigid and the flexible forms, in which the forms are arranged in a substantially horizontal plane, a flexible fabric hammock disposed between the forms and arranged to support the thermoplastic sheet, means to move the sheet between the forms and to lay it upon the hammock, said means comprising a carriage split into two sections to receive the sheet, and means to move the sections of the carriage apart to allow the sheet to drop onto the hammock.

4. Apparatus for tempering and bending of glass sheets by contact with two refrigerated forms disposed in a substantially vertical plane, characterized in that one form has a rigid face and the other form comprises a sealed box forming a hermetically sealed cell having a flexible face which contacts the glass sheet, said flexible face being in the form of a flexible membrane, said membrane being of a woven fabric of a material selected from the group consisting of glass and metal, and is coated with an elastomer which renders the fabric impermeable to fluid and elastic, means to circulate a cooling fluid in contact with face of the rigid form, said box having means to circulate a cooling fluid in contact with the membrane and to apply pressure to the membrane, and means to support the glass sheet between the forms comprising a sling of flexible refractory fibers.

5. Apparatus according to claim 4 in which the forms are disposed above a heating means, and the sling moves the glass sheet from the heating means to between the forms.

6. Apparatus according to claim 4, characterized in that the flexible membrane is stretched on a frame on the box, which surrounds and extends from a flat surface and is clamped in position by a second frame beyond the periphery of the first frame.

7. Apparatus for the bending and tempering of glass sheets by contact with refrigerated forms, characterized in that one form has a rigid face and the other form comprises a sealed box forming a hermetically sealed cell having a flexible face which contacts the glass sheet, said face being in the form of a flexible membrane which is impermeable to fluid and resistant to heat, means to circulate a cooling fluid in contact with both faces and to apply pressure to said membrane, said membrane being of woven fabric of a material selected from the group consisting of glass and metal, and being coated with an elastomer which renders the fabric impermeable to fluid and renders it elastic, said flexible membrane being arranged in a horizontal plane, a hammock of fabric of refractory fibers being placed above said flexible membrane, means for tensioning the flexible membrane, a movable truck for supporting and transporting the cold flexible form and the hammock, means for transporting the hot glass sheet to a position above the hammock at the start of the tempering and bending, said last named means including retractable elements, which allow the sheet of glass to drop onto the hammock, and are moved to allow the rigid form to move downward to engage the glass sheet on the hammock to apply working pressure to the glass sheet between the two forms, said retractable elements being formed as two sections of a split table, which sections are movable in a direction perpendicularly to the direction of movement of the glass into the space between the forms, each of said section being formed of a part of a series of idler rollers, the axis of the rollers being perpendicular to said movement of the glass sheet, another frame which is movable vertically with respect to the series of idler rollers and which carries a series of friction rollers which rotate on an axis parallel to the movement of the glass sheet, means for heating the glass, said truck moving the glass sheet from the heating means to the friction rollers, means for raising the friction rollers to receive the glass sheet and to lower the friction rollers to deposit the glass sheet on the idler rollers, and means to retract the split table sections to deposit the glass sheet on the hammock.

8. An apparatus according to claim 7 in which there are means to center the glass sheet with respect to the forms.

9. An apparatus according to claim 7 in which there are rails on which the sections of the split table move and jack means to raise and lower the friction rollers.

10. An apparatus according to claim 7 in which there are standards on the truck for tensioning the hammock.

11. An apparatus according to claim 7 in which the rigid form and the flexible form have complementary profiles.

References Cited
UNITED STATES PATENTS

| | | | |
|---|---|---|---|
| 3,365,286 | 1/1968 | Nedelec | 65—104X |
| 3,459,521 | 8/1969 | Nedelec | 65—104X |
| 3,473,909 | 10/1969 | Bennett et al. | 65—273X |

S. LEON BASHORE, Primary Examiner

S. R. FRIEDMAN, Assistant Examiner

U.S. Cl. X.R.

65—104, 114, 275, 287, 289, 348